Nov. 5, 1929.    H. B. SMITH    1,734,450
DAMPER
Filed Dec. 23, 1927
Fig-2    Fig-1    Fig-6
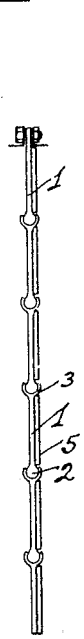
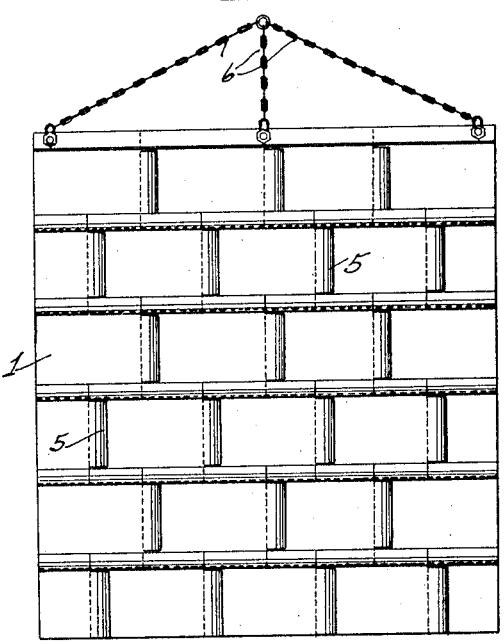
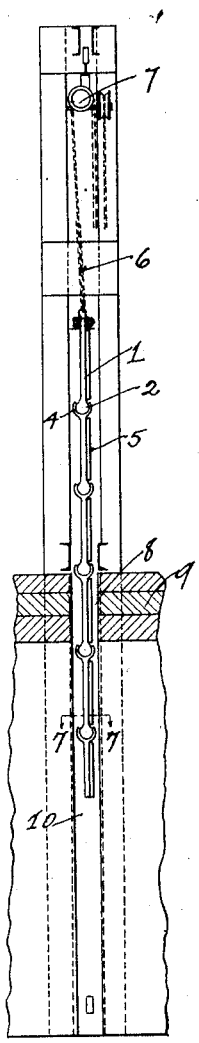
Fig-4
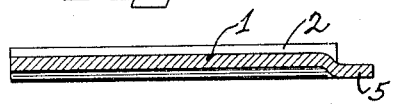
Fig-5    Fig-3
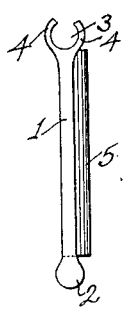
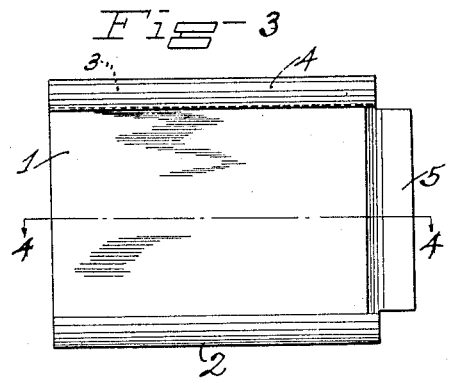
Fig-7
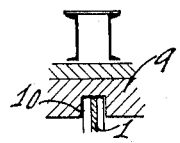
Herman B. Smith INVENTOR
BY
Gifford + Scull
ATTORNEYS Patented Nov. 5, 1929

1,734,450

UNITED STATES PATENT OFFICE

HERMAN B. SMITH, OF PLAINFIELD, NEW JERSEY, ASSIGNOR TO THE BABCOCK & WILCOX COMPANY, OF BAYONNE, NEW JERSEY, A CORPORATION OF NEW JERSEY

DAMPER

Application filed December 23, 1927. Serial No. 242,277.

This invention relates to a damper that can be made of calorized metal and will not be warped out of shape by heat. The invention will be understood from the description in connection with the accompanying drawings, in which Fig. 1 is a side view of the device; Fig. 2 is an edge view of the same; Fig. 3 is a side view of one of the details on an enlarged scale; Fig. 4 is a section along the line 4—4 of Fig. 3; Fig. 5 is an end view of Fig. 3; Fig. 6 is an end view showing the device in place; and Fig. 7 is a section along the line 7—7 of Fig. 6.

In the drawings reference character 1 indicates a metal section of such a character that a plurality of these sections can be assembled to form a damper of the desired size. The sections 1 are provided with lower rounded bulb edges 2, and with a groove or socket 3 along the opposite edge. The damper may however be made of alternate sections having rounded bulbs at opposite edges with the other sections having grooves or sockets at opposite edges. The groove or socket 3 is made of curved lips 4 of such a shape that the bulb portion 2 of another section can be inserted endwise to form a pivoted gas tight joint, the edges of the lips 4 being approximately the same distance apart as the thickness of the body portion of the sections 1. The sections 1 are provided at one end with a flange 5 that is offset a distance equal to the thickness of the section, as indicated in Fig. 4. The flange 5 extends from the bulb portion 2 to the lip 4 and overlaps the end of another section 1 when the parts are assembled. The damper is made up of horizontal rows of sections 1 with their flanges 5 overlapping to provide gas tight joints and alternate rows begin with shorter sections than the others to provide staggered joints. The bulbs can be dispensed with along the lowest row of sections and the grooves or sockets can be dispensed with along the uppermost row of sections. It will be obvious that most of the sections 1 are duplicates of each other and that there are not many varieties of section 1 necessary for making the damper.

The damper may be suspended from its upper edge by means of chains 6 and hoisting mechanism 7 may be provided for raising and lowering the damper through slot 8 in a wall 9. Grooves 10 may be provided in the sides of the wall along which grooves the edges of the damper slide.

The individual sections 1 are of small size and since each row is pivotally suspended from an upper row, it is obvious that the damper will not warp appreciably due to changes in temperature and that the pivoted joints and the overlapping joints will not permit passage of gas therethrough.

Changes and modifications can be made without departing from the spirit or scope of the invention.

I claim:

1. A damper comprising a plurality of sections each having a solid bulb along one edge and a groove along the opposite edge.

2. A damper comprising a plurality of sections each having a bulb along one edge and a groove along the opposite edge, and an offset flange at one end.

3. A damper comprising a plurality of sections each having a bulb along one edge and a groove along the opposite edge, and an offset flange at one end, said groove terminating at said flange.

4. A damper comprising a plurality of sections each having a bulb along one edge and a groove along the opposite edge, said sections being of different lengths.

5. A damper comprising a plurality of sections each having a bulb along one edge and a groove along the opposite edge, and the joints between the ends of sections in successive rows being broken.

6. In a damper a plurality of sections and means to support a row of said sections from an upper row and maintain flexible gas tight joints between them, and gas tight joints between ends of sections in the same row.

7. A damper comprising a plurality of sections each having a round solid bulb along one edge and a round groove along the opposite edge.

8. A damper comprising a plurality of sections each having a bulb along one edge and a groove along the opposite edge, said sections being assembled to make a damper having substantially straight edges and staggered joints.

9. A damper comprising a plurality of sections having interfitting grooves and solid bulbs along the edges thereof.

10. A damper comprising a plurality of sections having solid bulbs along the edges of some of said sections fitting into grooves along the edges of some of the other sections.

HERMAN B. SMITH.